April 29, 1941.　　　C. L. McCORMICK　　　2,239,854
WING AIR BRAKE
Filed Dec. 19, 1939　　2 Sheets-Sheet 1
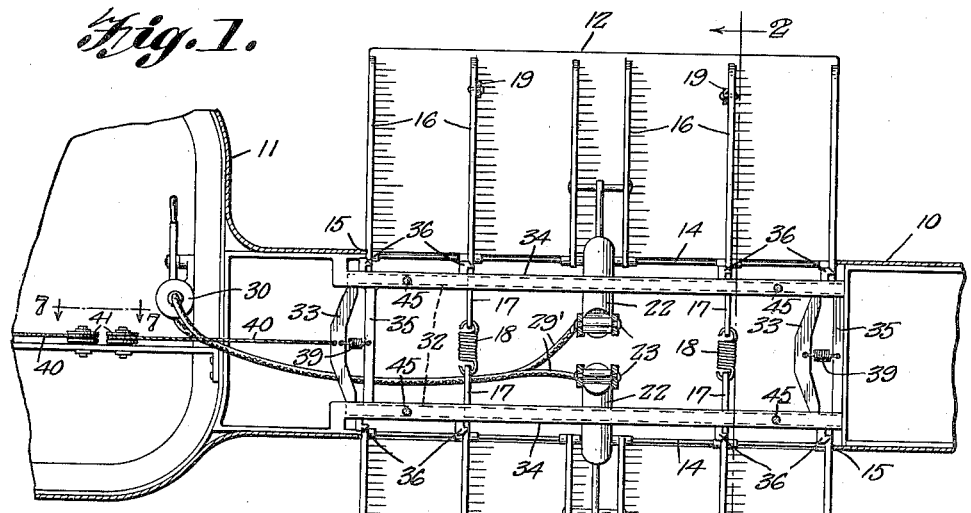

April 29, 1941.          C. L. McCORMICK          2,239,854
                            WING AIR BRAKE
                         Filed Dec. 19, 1939          2 Sheets-Sheet 2
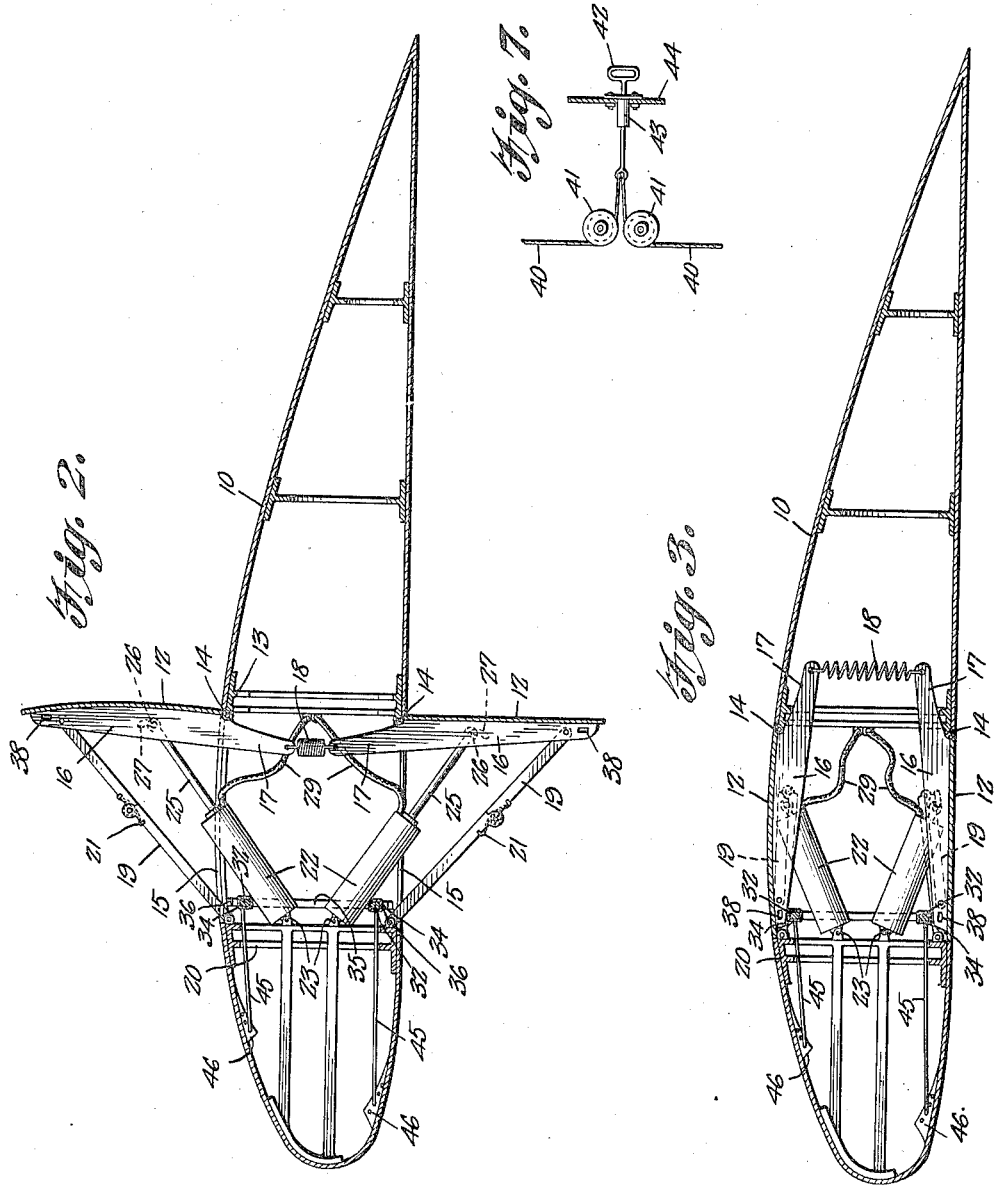
Cecil L. McCormick,
INVENTOR
BY Victor J. Evans & Co.
ATTORNEYS Patented Apr. 29, 1941

2,239,854

UNITED STATES PATENT OFFICE 2,239,854

WING AIR BRAKE

Cecil Leonard McCormick, Hialeah, Fla.

Application December 19, 1939, Serial No. 310,071

3 Claims. (Cl. 244—113)

This invention relates to wing air brakes for airplanes and has for an object to provide hinged panels adapted to be set to extend above and below the surface of each wing and check forward landing speed and thereby materially shorten ground run in landing and eliminate the tendency to nose over as often occurs with hand-operated brakes on landing gear or in the use of a hook and cable as practiced in naval carrier operations.

A further object is to provide wing air brakes in the nature of panels which, in addition to offering resistance area in the line of motion of the plane, will also direct air back into the trailing edge of the wing structure to produce a parachute effect to assist in checking forward speed.

A further object is to provide a device of this character which may be applied to all types of planes, which will be inexpensive to manufacture and install, which will be formed of a few simple strong and durable parts, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification:

Figure 1 is a fragmentary cross sectional view of a wing and portion of a cockpit, the wing being equipped with air brakes constructed in accordance with the invention.

Figure 2 is a longitudinal sectional view of an airplane taken on the line 2—2 of Figure 1, showing the air-brakes in operative position.

Figure 3 is a longitudinal sectional view of the airplane showing the air brakes in released position.

Figure 4 is an enlarged detail sectional view of a brake panel, in closed position, and showing one of the latches.

Figure 5 is a longitudinal sectional view of the pneumatic cylinder for closing the panels after each operation and for cushioning the shock of opening movement of the panel.

Figure 6 is a plan view of the cylinder shown in Figure 5.

Figure 7 is a detail sectional view taken on the line 7—7 of Figure 1, showing the latch releasing means.

Referring now to the drawings in which like characters of reference designate similar parts in the various views, 10 designates a wing and 11 a portion of the cockpit of a conventional airplane. In carrying out the invention a pair of panels 12 are hinged to the rear longitudinal spar 13 as shown at 14 and are adapted to normally close openings 15 formed in the top and bottom surfaces of the wing and form part of the wing surface. Each panel is provided with a plurality of reinforcing ribs 16 and a pair of these ribs extend beyond the hinged end of the panel as shown at 17. The extensions 17 of the upper panels and of the lower panels are connected together by helical springs 18. The springs are under slight tension when the panels are closed and operate to initially start swinging open movement of the panels when the panels are released so that the panels may be easily swung open by air pressure to extend perpendicularly from the wing as shown in Figures 1 and 2.

A pair of jointed braces 19 are pivotally connected to the front longitudinal spar 20 of the wing, and are pivotally connected to the free ends of a pair of the ribs, as best shown in Figure 2. The jointed braces have springs 21 assembled with their hinges to initiate folding movement of the braces.

A pair of pneumatic cylinders 22, one for the upper panel and one for the lower panel, are hingedly connected at their forward ends as shown at 23 to the front spar 20. As best shown in Figure 5, each cylinder is provided with a piston 24, having a piston rod 25 which extends through the free end of the cylinder, and is provided with a pivot pin 26 which is mounted in an arcuate slot 27 in a respective rib 16. An inner helical spring 28 is sleeved upon the piston rod and extends from end to end of the cylinder. An outer helical spring 29 is disposed in the cylinder at the free end thereof and extends for a short distance longitudinally of the inner spring 28. The piston 24 is normally disposed at the pivoted end of the cylinder, as shown in Figure 5, when the panels 12 are closed, as shown in Figure 3.

When the panels are unlocked, as will presently be described, air pressure co-acting with the springs 18, opens the panels to the position shown in Figure 2. The panels pull the piston rods and pistons outwardly, the piston first compressing the spring 28 to absorb shock of opening movement of the panel, and finally impinging against the spring 29, which latter absorbs the shock of final opening movement, so that the panels are presented to the wind without danger of breaking.

For closing the panels after each operation air is pumped into the free end of each cylinder through a respective air pipe 29' leading from a pump 30 disposed in the cockpit 11. The pump in the present embodiment of the invention is shown as a hand pump although any type of pump may be used. Operation of the air pump forces air into the cylinder against the piston to move the piston to the pivoted end of the cylinder and carry the piston rod to retract the respective panel to closed position. The springs 21 of the jointed braces tend to initially start folding movement of the braces to permit the panel to close. When the piston has arrived at its limit of movement it uncovers an air release port 31 in the cylinder to permit the air pressure to be relieved within the cylinder so that there is no air pressure in the apparatus under normal flying conditions.

For latching the panels closed, a substantially rectangular frame, comprising longitudinal bars 32 and end bars 33, is slidably mounted in a stationary guide frame comprising longitudinal guide bars 34 which receive the longitudinal bars of the sliding frame and which are anchored to the wing structure by cross bars 35, as best shown in Figure 1. A plurality of latches 36, each having a lateral tooth 37, best shown in Figure 4, are mounted on the longitudinal frame bars 32 of the sliding frame and the teeth are normally engaged in notches 38 formed in the ribs 16, as best shown in Figure 1. The latches are normally held in latching position by helical springs 39 which are connected to the end bars 33 of the sliding frame and are connected to the end bars 35 of the guide frame to hold the sliding frame at its outward limit of movement away from the cockpit.

For releasing the latches to permit the panels to open, a cable 40 for each wing, best shown in Figure 7, is connected to the end bar 33 of the sliding frame in the wing and trained over a pulley 41 in the fuselage, to a pull rod 42 mounted in a guide 43 on the instrument panel 44, or other location. When the operator pulls the pull rod 42 the cables 40 of both wings are pulled to move the sliding frame of each to its limit of endwise movement toward the cockpit to withdraw the teeth 37 from the notches 38 and release the latches.

In operation when it is desired to check landing speed the pull rod 42 is pulled outwardly to dislodge the latches 36 from the notches 38 in the ribs 16. Thereupon the springs 18 retract and initially start opening movement of the panels 12. When the leading edges of the panels rise above the surface of the wings the air gets under the panel and lifts the panel to a position perpendicular to the wing. Such movement of the panels is cushioned by the springs 28 and 29 in the cylinders 22. The jointed braces 19 in the meanwhile are opened to reinforce and brace the open panels. After the landing has been completed the operator pumps air into the cylinders 22 to move the pistons 24 to normal position for drawing the panels to closed position to form a continuation of the surface of the wing.

For reinforcing the longitudinal bars 34 of the guide frame brace members 45, best shown in Figure 2, are connected to brackets 46 secured to the wing structure and to the longitudinal bars.

It will be pointed out that when the panels are open, air pressure against the panels is diverted down into the wing, to build up at the trailing edge of the wing and create a parachute effect which coacts with the resistance area of the panels to assist in checking forward speed.

From the above description it is thought that the construction and operation of the invention will be fully understood without further explanation.

What is claimed is:

1. A wing air brake for airplanes comprising, the combination with an airplane wing, of a panel hinged at the rear edge to the wing and adapted to form part of the wing surface in closed position and to extend substantially perpendicularly to the wing surface when open, spring means connected to the rear edge of the panel and adapted to initiate opening of the panel to permit the wind to complete opening movement of the panel, spring pressed latch means connected to the wing and engaging the panel to normally hold the panel closed, means for manually releasing the latch means, a combined shock absorber and pneumatic cylinder hinged to the wing and connected to the panel for opening the panel, and means for supplying a pressure medium to the cylinder.

2. A wing air brake for airplanes comprising, the combination with an airplane wing, of a panel hinged at the rear edge to the wing and adapted to form part of the wing surface in closed position and to extend substantially perpendicularly to the wing surface when open, spring means connected to the rear edge of the panel and adapted to initiate opening of the panel, a guide frame extending longitudinally of the wing below the panel, a frame slidably carried by the guide frame having integral latch means adapted to engage the panel and normally hold the panel closed, manually operative means connected to the sliding frame to move the sliding frame to release the latch means, springs connected to the sliding frame and to the guide frame for moving the sliding frame to engage the latch means with the panel, a combined shock absorber and pneumatic cylinder hinged to the wing and connected to the panel for opening the panel, and means for supplying a pressure medium to the cylinder.

3. A wing air brake for airplanes comprising, the combination with an airplane wing, of a panel hinged at the rear edge to the wing and adapted to form part of the wing surface in closed position and to extend substantially perpendicularly to the wing surface when open, spring means connected to the rear edge of the panel and adapted to initiate opening of the panel, spring pressed latch means connected to the wing and engaging the panel to normally hold the panel closed, means for manually releasing the latch means, a cylinder hinged at one end to the wing, a piston in the cylinder having a piston rod pivotally and slidably connected to the panel, an inner spring sleeved on the piston rod within the cylinder and normally holding the piston at the hinged end of the cylinder to hold the panel closed, an outer spring of less length than the inner spring disposed in the cylinder at the free end thereof and co-acting with the inner spring to absorb shock when the panel opens, a fluid pressure means connected to the free end of the cylinder for supplying a pressure medium to the cylinder to move the piston to normal position for closing the panel, and a release port in the cylinder exposed by the piston when in normal position to relieve air pressure from the cylinder.

CECIL LEONARD McCORMICK.